United States Patent [19]

Goldsmith

[11] Patent Number: 5,121,891

[45] Date of Patent: Jun. 16, 1992

[54] TRANSFERABLE STANCHION SYSTEM

[75] Inventor: Howard G. Goldsmith, Cranston, R.I.

[73] Assignee: Todd Enterprises, Inc., Cranston, R.I.

[21] Appl. No.: 684,023

[22] Filed: Apr. 11, 1991

[51] Int. Cl.$^5$ ............................................. F16M 11/00
[52] U.S. Cl. ..................... 248/188.8; 108/150; 248/501; 403/199; 403/263
[58] Field of Search ............... 248/188.8, 188.1, 188, 248/500, 501, 151, 176; 108/150; 403/190, 199, 194, 197, 263

[56] References Cited

U.S. PATENT DOCUMENTS

| | | | |
|---|---|---|---|
| 3,348,797 | 10/1967 | Turbyfill | 248/188.1 X |
| 3,415,475 | 12/1968 | Goodman | 248/188.1 X |
| 3,464,662 | 9/1969 | Myers | 248/188.1 X |
| 4,662,591 | 5/1987 | Encontre | 248/188 |
| 4,925,140 | 5/1990 | Camarota | 248/188 |

*Primary Examiner*—Ramon O. Ramirez
*Attorney, Agent, or Firm*—Salter, Michaelson & Benson

[57] ABSTRACT

System in which a stanchion and an attached accessory can be moved and locked to any one of a number of location plates, each plate having a socket to receive a cap at the lower end of the stanchion, and threaded means for locking the cap and socket together.

5 Claims, 1 Drawing Sheet

TRANSFERABLE STANCHION SYSTEM

BACKGROUND OF THE INVENTION

There are many situations in industrial, commercial, and recreational activities where it is desirable to be able to move elements from one place to another and quickly fasten them in that location. An example of this type of manipulation is on board a boat, ship, or yacht. In a yacht, for instance, it is desirable to be able to move furniture, such as a table, from one location to another and to secure it at each location against movement of the vessel. Because of the limited space on a yacht, it is not practical to provide several tables that are permanently fastened to the deck or the cabin sole. In the past, therefore, a system has been used that involves providing several permanently-fastened sockets throughout the yacht. The table is provided with a single leg or stanchion that fits into any selected socket for use at a selected location. This type of device is shown and described, for instance, in the U.S. Pat. No. to CAMAROTA 4,925,140 where the leg frictionally and wedgingly engages the selected socket. Such systems for the transfer of furniture can also be used for other types of accessories or articles, such as a compass binnacle, where it is desirable to remove and store the item when it is not being used.

Unfortunately, these known systems for providing for the removal and transfer of articles have suffered from a number of defects. Among several difficulties encountered with the prior art systems, such as CAMAROTA, is the fact that the socket and stanchion tend to wear and to deform, thus causing them to fit loosely. In a ship or yacht, such looseness is impermissible, because the motion of the vessel and the movement of the stanchion bring about accentuated motion of the table surface at the top of the stanchion. These and other difficulties experienced with the prior art devices have been obviated in a novel manner by the present invention.

It is, therefore, an outstanding object of the invention to provide a transferable stanchion system in which a table or the like can be firmly held in one of several selected locations.

Another object of this invention is the provision of a table stanchion that can be quickly secured in one of several permanent locations.

A further object of the present invention is the provision of a stanchion locking system particularly adapted to use on a yacht or other vehicle where space is at a premium.

A still further object of the invention is the provision of a stanchion and socket in which movement of the socket does not cause a multiplied movement of the upper end of the stanchion.

It is a further object of the invention to provide a semi-permanent locking system for a leg or stanchion, which system operates quickly and without failure.

Another object of the invention is the provision of a secure stanchion system which is simple and rugged in construction, which can be easily manufactured from readily-available materials, and which is capable of a long life of use with a minimum of maintenance.

With these and other objects in view, as will be apparent to those skilled in the art, the invention resides in the combination of parts set forth in the specification and covered by the claims appended hereto.

SUMMARY OF THE INVENTION

In general, the invention relates to a stanchion system for use on the surfaces of yachts, campers, and the like, in which the system includes an elongated main body or stanchion and a plurality of plates fastened to various locations on the surfaces. Each plate has a socket with a bottom wall, while a cap is mounted on one end of the main body and is provided with a tapered external surface. Threaded means is provided, including a threaded bore in the cap and a threaded stud fixed to the bottom wall of the socket of each plate whereby the stanchion and cap may be threadedly engaged with the threaded stud to tightly draw the cap into the socket. Means are provided for preventing relative rotation between the threaded stud and the bottom wall of the socket in order to retain the stud stationary while the stanchion cap is being screwed thereon.

BRIEF DESCRIPTION OF THE DRAWINGS

The character of the invention, however, may be best understood by reference to one of its structural forms, as illustrated by the accompanying drawings, in which.

DESCRIPTION OF THE PREFERRED EMBODIMENT

Figure 1:
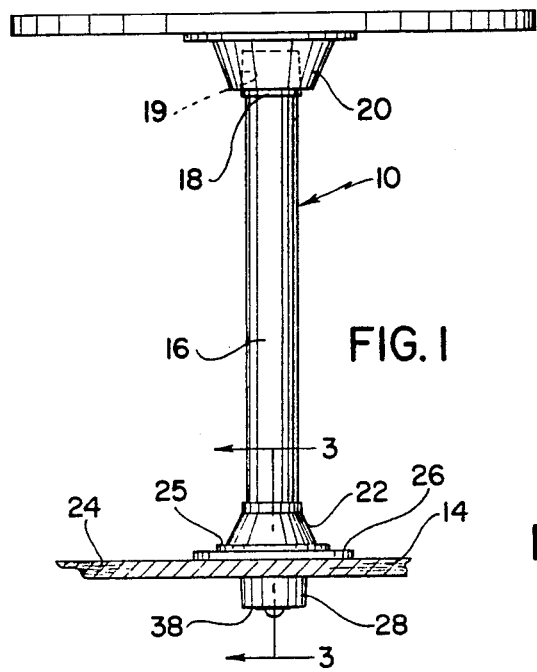
FIG. 1 is an elevational view of a transferable stanchion system embodying the principles of the present invention and showing it in use with a table.

Referring first to FIG. 1, which best shows the general features of the invention, the transferable stanchion system, indicated generally by the reference numeral 10, is shown as including an elongated tubular main body or stanchion 16 carrying on its upper end an accessory, such as the table 12. Its lower end is connected to a flat horizontal surface of a structure, such as the deck 14 of a yacht. The elongated tubular main body 16 of the stanchion system has at its upper end a tapered end cap or adapter 18 which frictionally and wedgingly engages into a tapered socket 19 provided in a fitting 20 that is secured to the undersurface of the table 12. At its lower end, the main body is provided with a cap 22 having a frusto-conical surface 23 and peripheral flange 25. A location plate 26 is fastened to the surface 24 of the deck 14, as by screws 27, the plate having a socket 28 which is shaped to receive the aforementioned external surface of the cap 22 in close-fitting relationship, it being understood that suitable apertures are provided in deck 14 through which socket 28 may extend.

Figure 2:
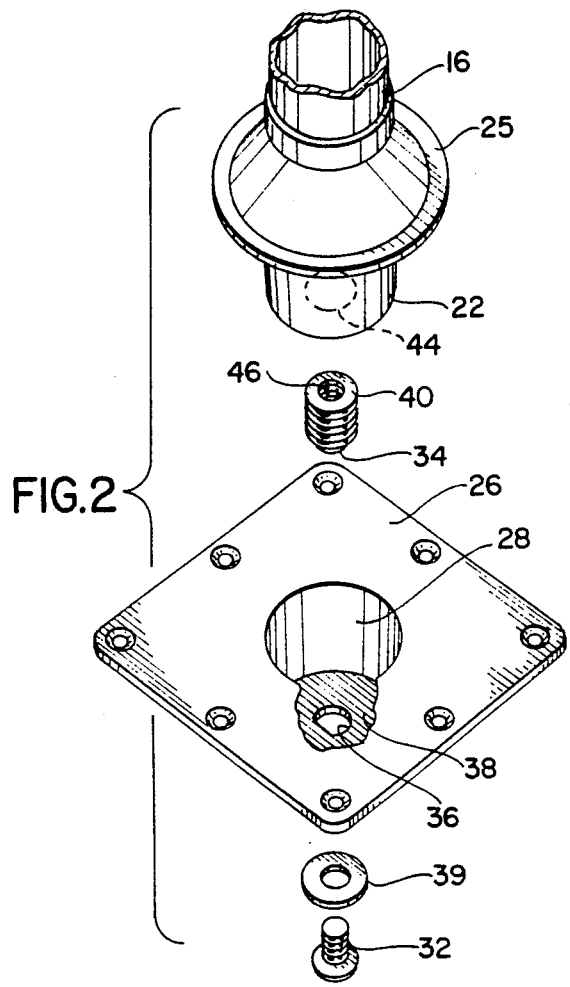
FIG. 2 is an exploded perspective view of the stanchion system with portions broken away.
Figure 3:
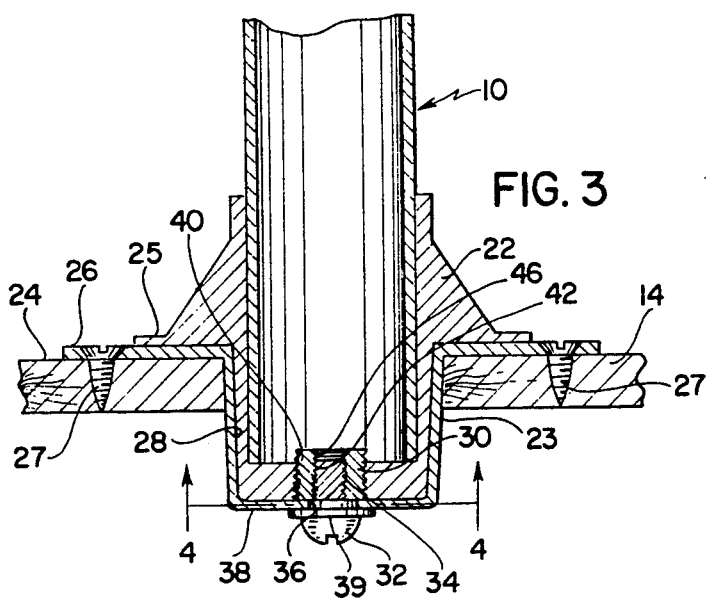
FIG. 3 is an enlarged section taken on the line 3—3 of FIG. 1.

FIGS. 2 and 3 show the manner in which the assembly is provided with a threaded means, indicated generally by the reference numeral 30, for joining the cap 22 to the plate 26 to lock them tightly together. The threaded means includes a bolt 32 which extends through a non-circular aperture 36 in a bottom wall 38 of the socket 28. The threaded means also includes a stud 40 that is fixed to the bottom wall of the socket so as to extend upwardly therefrom, in order that it may be threadedly engaged by a threaded bore 44 in the cap 22.

Figure 4:
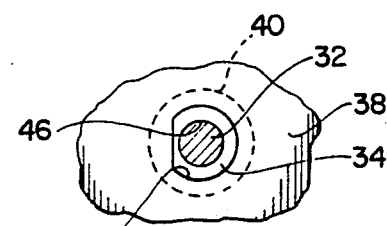
FIG. 4 is a sectional view taken on the line 4—4 of FIG. 3.

The stud 40 has a threaded bore 46 into which the bolt 32 is threaded to secure the stud to bottom wall 38. The bottom wall 38 of the socket is actually clamped between the head of the bolt and a washer 39 (on the one hand) and the bottom of the stud (on the other hand). As best shown in FIG. 3 and 4, the bottom of the stud 40 is provided with an extension or root 34 positioned within aperture 36, said root having a cross-sectional shape exactly the same as that of the non-circular aperture 36 in the bottom wall 38 of the socket. In the preferred embodiment of the invention, the aperture 36 and the root 34 have a non-circular shape that consists of a circle provided with a flat, secant, or chord that locks them against relative rotation.

The operation and advantages of the present invention will now be readily understood in view of the above description. To begin with, assuming that the stanchion system 10 is to be used in a vessel, such as a yacht, a plurality of the plates 26 would be located throughout the vessel. Some plates might be located on deck and some in the cabin sole. In any event, the stanchion main body with the accessory, such as the table 12, can be firmly mounted in any selected location and, nevertheless, is transferable to any other location without difficulty.

It should be understood that the underside of the deck 14 to which the plate 26 is screwed may not be easily accessible, so that it is important that certain elements of the stanchion system be established on the plate before it is fastened to the deck. For instance, the bolt 32 and its washer is inserted through the aperture 42 in the bottom wall 38 in the plate socket 28. The stud 40 is then placed against the upper surface of the bottom wall with the root 34 positioned within the aperture 36. A turning of the bolt 32 will thread it into the threaded bore 46 in the stud, and since the stud is prevented from turning by the non-circular nature of the engagement between the root 34 and the aperture 36, the stud will be securely mounted to bottom wall 38. Each of the plates is in this condition after it has been fastened to its respective deck or cabin sole.

It is possible, then, to approach any selected plate with the stanchion and table combination and quickly lock them to the plate. The stanchion main body is turned to screw the threaded bore 44 in the cap 22 onto the stud 40. Eventually, the cap is drawn into a position in the socket where its tapered external surface 23 wedgingly and tightly engages the inner tapered surface of the socket 28. At the same time, the flange 25 is drawn tightly into contact with the upper surface of the plate 26.

It can be seen, then, that the present invention assures that the table 12 or other accessory is held securely onto the deck of the vessel and will not move or wobble because of looseness between the bottom of the stanchion and the deck plate. Even in situations in which wear takes place (due to long use) or in which or deformation takes place (due to rough seas or abuse), the tightness remains. This is because the system automatically provides for compensation for such wear or deformation. Nevertheless, the stanchion and its accessory can be easily moved to another location and locked to another plate. An inspection of the elements of the invention will show that it can be easily and inexpensively manufactured and that it will require very little maintenance to assure that the function remains over a long period of time. For example, the caps 18 and 22 may be of molded plastic, and stanchion 16 of metal or plastic, all materials being selected to provide the required structural strength and to resist corrosion.

It is obvious that minor changes may be made in the form and construction of the invention without departing from the material spirit thereof. It is not, however, desired to confine the invention to the exact form herein shown and described, but it is desired to include all such as properly come within the scope claimed.

The invention having been thus described, what is claimed and desired to secure by Letters Patent is:

1. Transferable stanchion system, comprising
   (a) an elongated main body,
   (b) an adapter located at one end of the main
   (c) an accessory having a fitting for engagement with the said adapter,
   (d) a cap having a frusto-conical external surface on the other end of the main body,
   (e) a location plate adapted to be fastened to a flat surface, the plate having a socket shaped to receive the said external surface of the cap in close-fitting relationship, and
   (f) threaded means for drawing the cap into the socket to lock them tightly together.

2. Transferable stanchion system as recited in claim 1, wherein the threaded means includes a bolt extending through an aperture in a bottom wall of the socket.

3. Stanchion system for use on various surfaces of a vehicle, comprising
   (a) an elongated main body,
   (b) a plurality of plates fastened to various locations on the surfaces of the vehicle, each plate having a socket with a bottom wall,
   (c) a cap mounted on one end of the main body and having a tapered outer surface, and
   (d) threaded means, including a threaded bore in the cap and a threaded stud fixed to the bottom wall of the socket and extending upwardly therefrom so as to threadedly receive the threaded bore of the cap to tightly secure said main body within said socket.

4. Transferable stanchion system, comprising
   (a) an elongated main body,
   (b) an adapter located at one end of the main body,
   (c) an accessory having a fitting for engagement with the said adapter,
   (d) a cap having a frusto-conical external surface on the other end of the main body,
   (e) a location plate adapted to be fastened to a flat surface, the plate having a socket shaped to receive the said external surface of the cap in close-fitting relationship.
   (f) threaded means for drawing the cap into the socket to lock them tightly together, and
   (g) said threaded means also including a threaded stud having a noncircular root fitting in the aperture, which aperture is similarly non-circular in shape, the stud being fixed to the bottom wall of the socket by the bolt engaging a threaded bore in the cap.

5. Transferable stanchion system as recited in claim 4, wherein the stud has an axial threaded bore which is engaged by the threads on the bolt, so that the bottom wall of the socket is clamped between the head of the bolt and the stud.